United States Patent [19]

Evers

[11] 4,064,109

[45] Dec. 20, 1977

[54] PERFLUOROALKYLENE ETHER BIBENZOXAZOLE POLYMERS

[75] Inventor: Robert C. Evers, Dayton, Ohio

[73] Assignee: The United States of America as represented by the Secretary of the Air Force, Washington, D.C.

[21] Appl. No.: 710,088

[22] Filed: July 30, 1976

[51] Int. Cl.$^2$ ............................................. C08G 73/22
[52] U.S. Cl. .................................... 260/61; 260/47 R
[58] Field of Search .................. 260/47 R, 61, 47 CP

[56] References Cited

U.S. PATENT DOCUMENTS

| | | | |
|---|---|---|---|
| 3,810,874 | 5/1974 | Mitsch et al. | 260/75 H |
| 3,846,374 | 11/1974 | Evers | 260/61 |

Primary Examiner—Lester L. Lee
Attorney, Agent, or Firm—Joseph E. Rusz; Cedric H. Kuhn

[57] ABSTRACT

Perfluoroalkylene ether bibenzoxazole polymers are prepared by the polycondensation of perfluoroalkylene ether bis(o-aminophenol) compounds and perfluoroalkylene ether-imidate and -thioimidate esters synthesized by the reaction of certain perfluoroalkylene ether dinitriles with trifluoroethanol or ethanethiol. In addition to possessing high thermooxidative stability and good low temperature viscoelastic properties, the elastomeric polymers have a superior hydrolytic stability. This combination of properties renders the polymers particularly useful as seals and sealants in severe environments.

6 Claims, No Drawings

PERFLUOROALKYLENE ETHER BIBENZOXAZOLE POLYMERS

RIGHTS OF THE GOVERNMENT

The invention described herein may be manufactured and used by or for the Government of the United States for all governmental purposes without the payment of any royalty.

FIELD OF THE INVENTION

This invention relates to perfluoroalkylene ether bibenzoxazole polymers. In one aspect it relates to a process for synthesizing the polymers.

BACKGROUND OF THE INVENTION

A large amount of research work has been performed with the view of providing thermally stable, elastomeric polymers for various aerospace seal and sealant applications. To meet the rigid requirements for such applications, a polymer must also retain its elastomeric properties at sub-zero temperatures. Polymers that advance the art in meeting the requirements are disclosed by me in U.S. Pat. No. 3,846,376. Furthermore, in my copending U.S. application Ser. No. 610,474, filed on Sep. 4, 1975, thermally stable polymers are disclosed that retain their viscoelastic properties at temperatures even lower than do the polymers described in the aforementioned patent. While the polymers disclosed in the cited patent and patent application possess a broad use temperature range, they are often hydrolytically unstable upon exposure to humid conditions for extended periods of time. It would be extremely desirable to have polymers with a broad use temperature range that are also hydrolytically stable in humid environments.

It is an object of this invention, therefore, to provide polymers which, in addition to having a high thermooxidative stability and a low glass transition temperature, possess superior hydrolytic stability properties.

Another object of the invention is to provide a process for synthesizing the polymers.

Other objects and advantages of the invention will become apparent to those skilled in the art upon consideration of the accompanying disclosure.

SUMMARY OF THE INVENTION

The present invention resides in a thermally stable polymer consisting essentially of repeating units having the following formula:

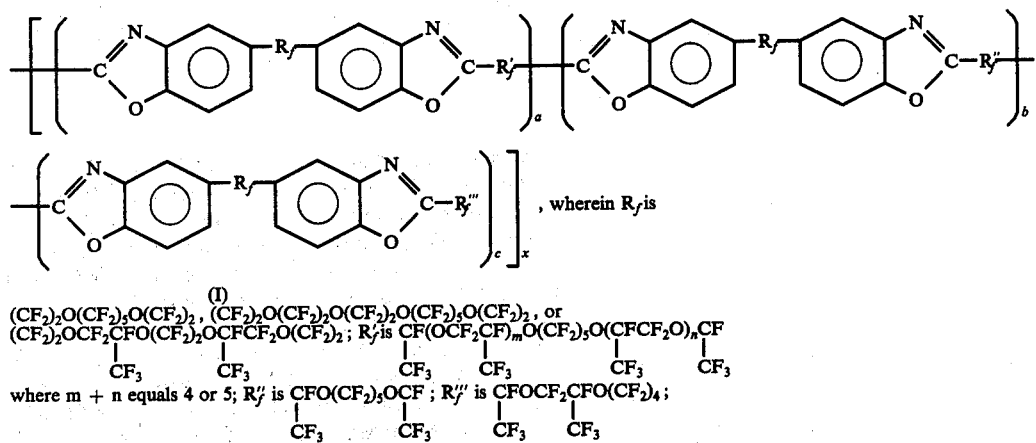

(I)
$(CF_2)_2O(CF_2)_5O(CF_2)_2$, $(CF_2)_2O(CF_2)_2O(CF_2)_2O(CF_2)_5O(CF_2)_2$, or
$(CF_2)_2OCF_2CFO(CF_2)_2OCFCF_2O(CF_2)_2$; $R_f'$ is $CF(OCF_2CF)_mO(CF_2)_5O(CFCF_2O)_nCF$
                    |                              |                    |              |            |
                    $CF_3$   $CF_3$                 $CF_3$              $CF_3$        $CF_3$       $CF_3$ where m + n equals 4 or 5; $R_f''$ is $CFO(CF_2)_5OCF$; $R_f'''$ is $CFOCF_2CFO(CF_2)_4$;
                                    |             |                |         |
                                    $CF_3$       $CF_3$           $CF_3$   $CF_3$ $a$ is 1 when $b$ and $c$ are each zero; $b$ is 0.7 and $c$ is 0.3 when a is zero; and $x$ is an integer equal to at least 2, preferably an integer in the range of about 4 to 100. Alternatively, $x$ can be defined as an integer having a value such that the polymer has an inherent viscosity of at least 0.10, e.g., from 0.10 to 1.0, when measured at 25° C as a 0.2 weight percent solution in hexafluoroisopropanol.

In one embodiment, the present invention lies in a process for preparing the perfluoroalkylene ether bibenzoxazole polymers by reacting in an inert atmosphere certain perfluoroalkylene ether bis(oaminophenol) compounds with certain perfluoroalkylene ether-imidate and -thioimidate esters. The polycondensation reaction is carried out in a solvent in the presence of glacial acetic acid. Examples of gases that are suitable for providing an inert atmosphere include nitrogen, helium and argon.

The monomers used and the condensation reaction involved in preparing the polymers of this invention are illustrated by the following equation:

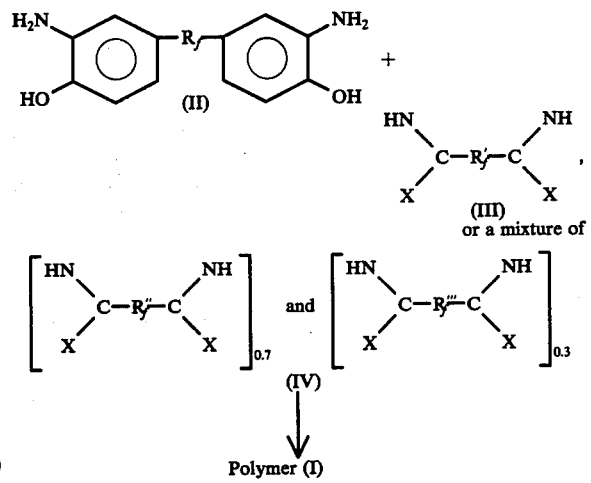

In the foregoing equation, X is $SC_2H_5$ or $OCH_2CF_3$ and $R_f$, $R_f'$, $R_f''$, and $R_f'''$ are as defined hereinabove. As seen from the equation, the source of the $R_f$ group is perfluoroalkylene ether bis(o-aminophenol) compound (II). The source of the $R_f'$ group is the imidate or thioimidate ester (III) while the source of the $R_f''$ or $R_f'''$ groups is the isomeric mixture of imidate or thioimidate esters (IV). In carrying out the reaction, equimolar amounts of the bis(o-aminophenol) compounds and the imidate or thioimidate esters are utilized. The mole ratio of glacial acetic acid to the imidate or thioimidate ester is at least 2:1, e.g., 2 to 6:1. During the condensation reaction, the glacial acetic acid reacts with ammonia that is formed, thereby driving the reaction to completion.

The condensation reaction is conducted in the presence of a halogenated hydrocarbon which is a solvent for the monomers. In order to obtain high molecular weight polymers, it has been found to be necessary to use hexafluoroisopropanol as the solvent. The temperature at which the condensation reaction is carried out usually ranges from about 50° to 70° C. The reaction period depends upon the molecular weight that it is desired the polymer product to have, being longer for higher molecular weight products. Generally, the reaction time ranges from about 7 to 20 days although shorter and longer periods can be employed.

At the end of the reaction period, the polymer is recovered and purified by a general procedure that is conventionally followed in solution polymerization processes. Thus, the reaction mixture is poured into a non-solvent for the polymer, e.g., into an alcohol such as methanol, thereby causing the polymer to precipitate from solution. The precipitated polymer is then separated from the liquid by any suitable means, such as by decantation or filtration. After washing the separated polymer with an alcohol, it is then dried at reduced pressure for 1 to 5 hours at a temperature ranging from 100 to 200° C. It is often desirable to redissolve the separated and washed polymer in a solvent, such as 1,1,2-trichlorotrifluoroethane, after which it is again precipitated from solution by pouring the solution into methanol. After separation of the precipitated polymer, it is again washed with methanol and then dried under a vacuum.

The following bis(o-aminophenol) compounds (II) are employed in preparing the polymers of this invention:
1. 1,11-bis(3-amino-4-hydroxyphenyl)perfluoro-3,9-dioxaundecane,
2. 1,14-bis(3-amino-4-hydroxyphenyl)perfluoro-5,10-dimethyl-3,6,9,12-tetraoxatetradecane, and
3. 1,17-bis(3-amino-4-hydroxyphenyl)perfluoro-3,6,9,15-tetraoxaheptadecane.

The above-listed compounds can also be represented by formula (II) above. In this formula $R_f$ is one of the following groups:

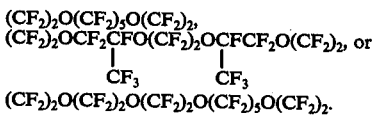

The preparation of 1,11-bis(3-amino-4-hydroxyphenyl)perfluoro-3,9-dioxaundecane is described in U.S. Pat. No. 3,846,376, issued to me on Nov. 5, 1974. The synthesis of the other two bis(oaminophenol) compounds listed above is disclosed in my pending patent application Ser. No. 610,470, filed on Sep. 4, 1975 and issued on Jan. 25, 1977 as U.S. Pat. No. 4,905,142. The disclosures of the aforementioned patents are incorporated herein by reference.

The imidate and thioimidate esters used in preparing the polymers of this invention correspond to formula (III) above in which

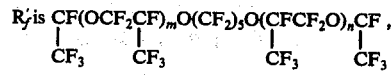

where $m+n$ equals 4 or 5. The isomeric mixture of imidate and thioimidate esters employed as monomers corresponds to formulas (IV) in which $R_f''$ and $R_f'''$ are, respectively,

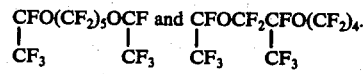

The synthesis of these compounds is described in my copending patent application Ser. No. 710,089, filed on July 30, 1976, the disclosure of which is incorporated herein by reference.

As disclosed in Ser. No. 710,089, the reaction involved in preparing compounds corresponding to formula (III) can be represented by the following equation:

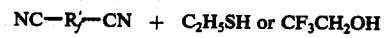

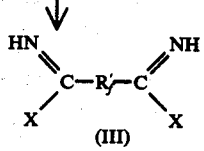

In the foregoing equation, $R_f'$ and X are as indicated hereinabove. When the dinitrile (V) is reacted with ethanethiol (VI), the product (III) is a thioimidate ester. Reaction of the dinitrile (V) with trifluoroethanol (VII) provides a product (III) which is an imidate ester.

The reaction involved in preparing a mixture of compounds corresponding to formula (IV) can be represented by the following equation:

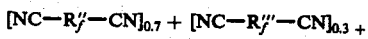

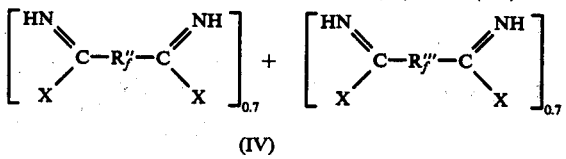

In the above equation, $R_f''$, $R_f'''$ and X are as indicated hereinabove. When the mixture of dinitriles (VIII) is reacted with ethanethiol (VI), the product (IV) is a mixture of thioimidate esters. Reaction of the mixture of dinitriles (VIII) with trifluoroethanol (VII) provides a product (IV) which is a mixture of imidate esters.

In carrying out the reactions represented by the foregoing equations, the perfluoroalkylene ether dinitrile or mixture of dinitriles is reacted in the presence of a catalytic amount of an alkali metal 2,2,2-trifluoroethoxide, an alkali metal thioethoxide, or triethylamine with an excess of ethanethiol or trifluoroethanol. Examples of alkali metal 2,2,2-trifluoroethoxides and thioethoxides that can be used include sodium and potassium 2,2,2-trifluoroethoxide and thioethoxides. In preparing imidate esters alkali metal 2,2,2-trifluoroethoxides are employed while in the preparation of the thioimidate esters alkali metal thioethoxides are used. However, it is usually preferred to utilize triethylamine as the catalyst, particularly because of its ease of removal from the reaction mixture. The amount of catalyst used can vary within rather broad limits, but it usually ranges from about 0.05 to 0.30 mole per mole of dinitrile. The mole ratio of the ethanethiol of trifluoroethanol to dinitrile is at least 2 to 1, e.g., 2 to 150:1. It is noted that the ethanethiol and trifluoroethanol in addition to being reactants function as reaction media.

The reaction is conducted at a temperature ranging from about 0° C to 100° C for a period of about 6 to 36 hours. At the end of the reaction period, when using triethylamine as the catalyst, the thioimidate or imidate ester product is recovered by distilling off triethylamine and any excess ethanethiol or trifluoroethanol. When employing an alkali metal 2,2,2-trifluoroethoxide or thioethoxide as the catalyst, the reaction mixture is washed several times with water. After each washing the settled water layer containing catalyst is separated and discarded. Any residual ethanethiol or trifluoroethanol is then distilled off, leaving the thioimidate or imidate ester product.

A more complete understanding of the invention can be obtained by referring to the following illustrative examples which are not intended, however, to be unduly limitative of the invention.

EXAMPLE I

A perfluoroalkylene ether bibenzoxazole polymer was prepared in a condensation reaction represented by the following equation and as described below.

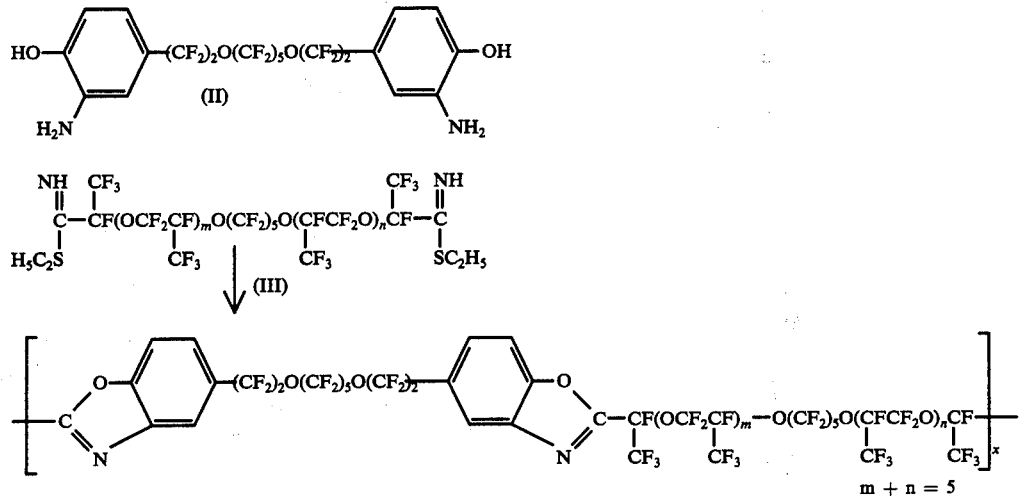

To a mixture of aminophenol (II) (0.350 g, 0.0005 mole) and thioimidate ester (III) (0.745 g, 0.0005 mole) was added 3 ml of redistilled hexafluoroisopropanol. Glacial acetic acid (0.12 g, 0.002 mole) was added with stirring to the resultant clear amber solution. The polycondensation reaction was allowed to proceed with stirring under nitrogen at 55°–60° C for 264 hours at which time the viscous reaction mixture was poured into 100 ml of stirred methanol. The supernatant liquid was decanted and the tacky, swollen polymer dissolved in 10 ml of Freon-113 fluorocarbon (1,1,2-trichlorotrifluoroethane). This solution was filtered and added dropwise to 100 ml of stirred methanol. The precipitated polymer was washed several times by vigorous stirring with methanol. Drying for one hour at 100° C (0.05 mm Hg) and 2 hours at 188° C (0.05 mm Hg) yielded 0.63 g (62% yield) of rubbery polymer ($\eta$ inh = 0.25 dl/g in hexafluoroisopropanol at 25° C).

Analysis Calc'd: C,27.83; H,0.30; N,1.38; Found: C,28.59; H,0.25; N,1.40

Thermogravimetric analysis indicated that onset of breakdown in air occurred at 400° C with a 25% weight loss at 500° C. Differential scanning calorimetry revealed a glass transition temperature of $-19°$ C.

EXAMPLE II

A perfluoroalkylene ether bibenzoxazole polymer was prepared in a condensation reaction represented by the following equation and as described below.

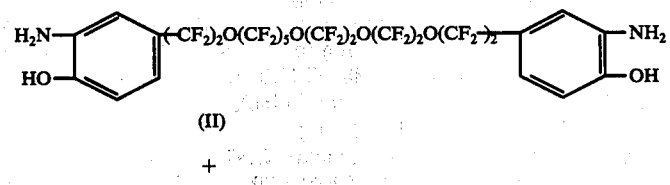

+

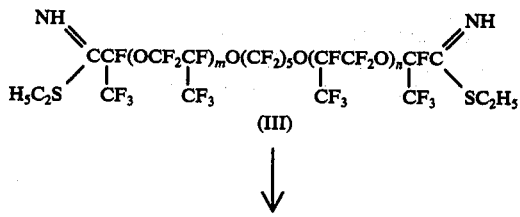

(III)

↓

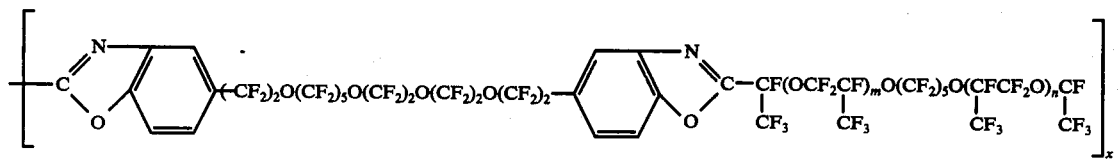

m + n = 5

Redistilled hexafluoroisopropanol (3 ml) was added to a mixture of aminophenol )II) (0.465 g, 0.0005 mole) and thioimidate ester (III) (0.745 g, 0.0005 mole). To the resulting clear amber solution was added glacial acetic acid (0.15 g, 0.0025 mole). The polycondensation reaction was allowed to proceed with stirring under nitrogen at 55°–60° C for 288 hours at which time the viscous amber solution was poured into 100 ml of methanol. The supernatant liquid was decanted and the swollen, tacky polymer redissolved in 10 ml of Freon-113 fluorocarbon. The polymer solution was filtered and added dropwise to 200 ml of vigorously stirred methanol. Washing of the precipitated polymer by vigorous stirring with additional portions of methanol followed by drying for two hours at 77° C (0.03 mm Hg) and four hours at 188° C (0.03 mm Hg) yielded 0.62 g (55% yield) of rubbery polymer ($\eta$ inh = 0.35 dl/g in hexafluoroisopropanol at 25° C).

Analysis Calc'd: C,27.10; H,0.27; N,1.24; Found: C,27.08; H,0.10; N,1.15

Thermogravimetric analysis indicated onset of breakdown in air at 400° C with a 30% weight loss at 500° C. Differential scanning calorimetry revealed a glass transition temperature of −34° C.

EXAMPLE III

A perfluoroalkylene ether bibenzoxazole polymer was prepared in a condensation reaction represented by the following equation and as described below.

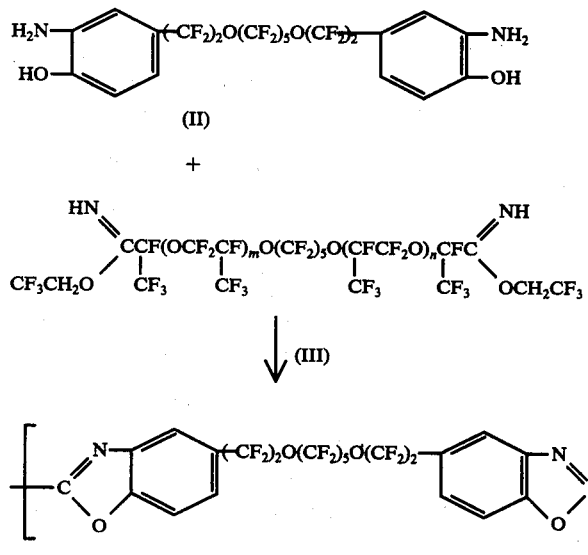

(m + n = 5)

Redistilled hexafluoroisopropanol (4 ml) was added to aminophenol (II) (0.698 g, 0.001 mole) and imidate ester (III) (1.564 g, 0.001 mole). To the resulting clear amber solution was added glacial acetic acid (0.25 g, 0.004 mole). The polycondensation reaction was allowed to proceed with stirring under nitrogen at 55°–60° C for 288 hours at which time the amber solution was poured into 200 ml of methanol. The supernatant liquid was decanted and the tacky polymer redissolved in 4 ml of Freon-113 fluorocarbon. The filtered polymer solution was added dropwise to 200 ml of methanol. Washing of the precipitated polymer by vigorous stirring with additional portions of methanol followed by drying for 4 hours at 77° C (0.03 mm Hg) and 4 hours at 188° C (0.03 mm Hg) yielded 1.13 g of soft rubbery polymer ($\eta$ inch = 0.11 dl/g in hexafluoroisopropanol at 25° C).

Analysis Calc'd: C,37,83; H,0.30; N,1.38; Found: C,27.80; H,0.40; N,1.80

The infrared spectrum of the polymer was identical to that of the polymer of Example I that was prepared with a thioimidate ester. Differential scanning calorimetry revealed a glass transition temperature of −20° C.

EXAMPLE IV

A perfluoroalkylene ether bibenzoxazole polymer was prepared in a condensation reaction represented by the following equation and as described below.

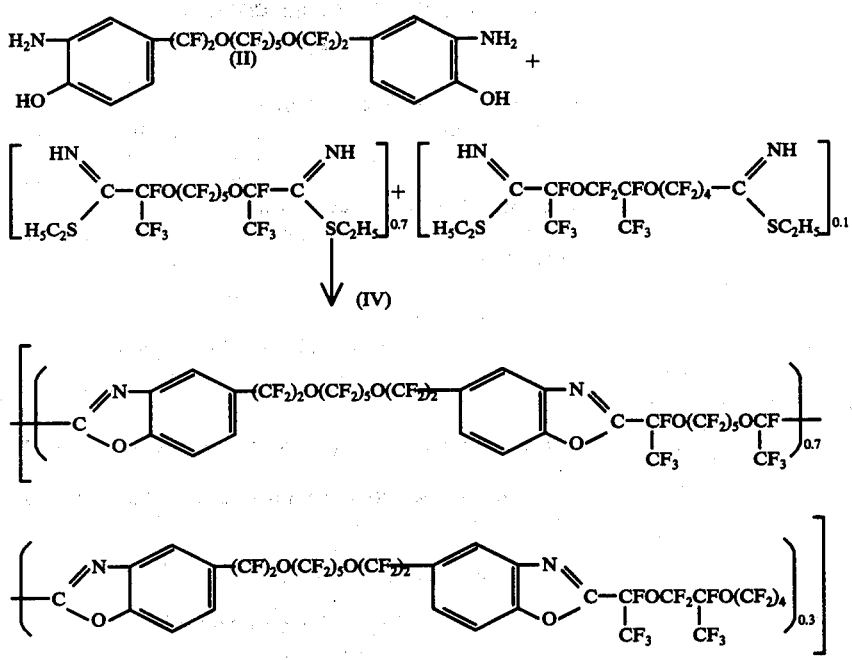

To a mixture of aminophenol (II) (0.349 g, 0.0005 mole) and isomeric mixture of thioimidates (IV) (0.329 g, 0.0005 mole) was added 3 ml of redistilled hexafluoroisopropanol. Glacial acetic acid (0.18 g, 0.003 mole) was added to the clear amber solution. The polycondensation reaction was allowed to proceed with stirring under nitrogen at 55°–60° C for 288 hours at which time the viscous solution was poured into 100 ml of methanol. The supernatant liquid was decanted and the polymer was redissolved in 4 ml of Freon-113 fluorocarbon. The filtered solution was slowly added to 150 ml of stirred methanol. The precipitated polymer was dried at reduced pressure (0.05 mm Hg) for one hour at 100° C and two hours at 188° C. The resultant rubbery polymer (0.37 g, 60% yield) exhibited an inherent viscosity of 0.38 dl/g in hexafluoroisopropanol at 25° C and a glass transition temperature of 4° C.

Analysis Calc'd: C,32.08; H,0.50; N,2.34; Found: C,32.00; H,0.33; H,2.33

EXAMPLE V

A series of hydrolytic tests was conducted at 95 percent relative humidity and 200° F on the polymers prepared in Examples I and II. Control tests were also carried out on bibenzoxazole polymers other than those disclosed herein. The polymers had the following structural formula:

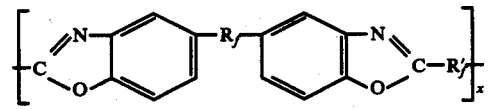

Listed in Table I below are the $R_f$ and $R_f'$ groups of the polymers used in the tests.

TABLE I

| Test No. | $R_f$ | $R_f'$ |
|---|---|---|
| 1(Ex.I) | $(CF_2)_2O(CF_2)_5O(CF_2)_2$ | $CFO(CF_2CFO)_m(CF_2)_5(OCFCF_2)_nOCF^{(1)}$ $\|\ \ \ \ \ \ \ \ \ \ \ \|\ \ \ \ \ \ \ \ \ \ \ \ \ \ \ \ \ \|\ \ \ \ \ \ \ \ \ \|$ $CF_3\ \ \ \ \ \ CF_3\ \ \ \ \ \ \ \ \ \ \ \ \ \ CF_3\ \ \ CF_3$ |
| 2(Ex.II) | $(CF_2)_2O(CF_2)_2O(CF_2)_2-$ $O(CF_2)_5O(CF_2)_2$ | $CFO(CF_2CFO)_m(CF_2)_5(OCFCF_2)_nOCF^{(1)}$ $\|\ \ \ \ \ \ \ \ \ \ \ \|\ \ \ \ \ \ \ \ \ \ \ \ \ \ \ \ \ \|\ \ \ \ \ \ \ \ \ \|$ $CF_3\ \ \ \ \ \ CF_3\ \ \ \ \ \ \ \ \ \ \ \ \ \ CF_3\ \ \ CF_3$ |
| 3(Control) | $(CF_2)_2O(CF_2)_5O(CF_2)_2$ | $CF_2O(CF_2CF_2O)_m(CF_2)_5(OCF_2CF_2)_nOCF_2^{(2)}$ |
| 4(Control) | $(CF_2)_2O(CF_2)_5O(CF_2)_2$ | $CF_2O(CF_2CF_2O)_m(CF_2)_5(OCF_2CF_2)_nOCF_2^{(3)}$ |

$^{(1)}m + n = 5$
$^{(2)}m + n = 6$
$^{(3)}m + n = 5$

The results obtained in the tests are shown below in Table II.

TABLE II

| Test No. | Hrs | Infrared[1] Absorption at 1740 cm$^{-1}$ | Original Tg, °C | Final Tg, °C | Original η inh- dl/g | Final η inh- dl/g |
|---|---|---|---|---|---|---|
| 1 (Ex. I) | 654 | Initially very weak absorption; did not change upon exposure | −19 | −23 | 0.25 | 0.23 |
| 2 (Ex. II) | 654 | Initially weak absorp- | −34 | −33 | 0.35 | 0.31 |

TABLE II-continued

| Test No. | Hrs | Infrared[1] Absorption at 1740 cm$^{-1}$ | Original Tg, °C | Final Tg, °C | Original η inh- dl/g | Final η inh- dl/g |
|---|---|---|---|---|---|---|
| 3 (Control) | 364 | tion; did not change upon exposure Slight absorption after 24 hrs; stronger absorption after 48 hrs as well as absorption at 1710 cm$^{-1}$; very strong absorption at 1710 cm$^{-1}$ after 70 hrs. Mushy at end. | −52 | (2) | 0.24 | (2) |
| 4 (Control) | 364 | Very strong absorption at 1710 cm$^{-1}$ after 170 hrs. Mushy at end. | −45 | (2) | 0.26 | (2) |

[1]Appearance of these bands is evidence of hydrolysis of the benzoxazole rings.
[2]Could not be measured because of the degraded condition of the polymer.

From the data in the foregoing examples, it is seen that the products of this invention are thermally stable, elastomeric polymers having a low glass transition temperature. Of particular significance the polymers are also characterized by having an outstanding hydrolytic stability. Thus, as shown by the data in Table II of Example V, polymers of this invention were unaffected by exposure to water vapor at an elevated temperature for long periods of time. The unexpected improvement in the hydrolytic stability is attributed to the structure of the imidate and thioimidate esters used as monomers. Thus, in the polycondensation reaction, the pendent $CF_3$ groups attached to the carbon atoms adjacent the terminal carbon atoms of the imidate and thioimidate esters become attached to the carbon atom at the 2-position of the benzoxazole ring. The presence of the $CF_3$ groups prevents water from attacking the benzoxazole rings, thereby enhancing the polymer's hydrolytic stability. As seen from Table II, the polymers used in Tests Nos. 3 and 4, which did not have the protective $CF_3$ groups, degraded upon exposure to the same humid conditions to which the polymers of this invention were subjected. The combination of properties possessed by the polymers of this invention makes them especially useful for many aerospace applications, e.g., as seals and sealants.

As will be evident to those skilled in the art, modifications of the present invention can be made in view of the foregoing disclosure without departing from the spirit and scope of the invention.

I claim:

1. A polymer composition consisting essentially of recurring units having the following formula:

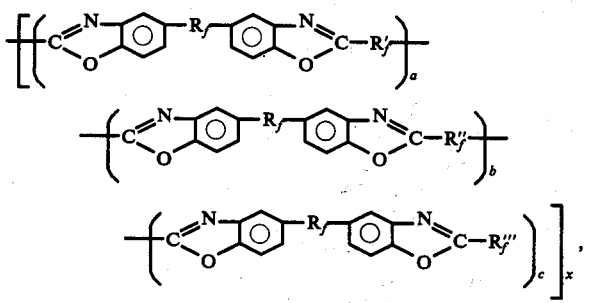

wherein $R_f$ is
$(CF_2)_2O(CF_2)_5O(CF_2)_2$, $(CF_2)_2O(CF_2)_2O(CF_2)_2O(CF_2)_5O(CF_2)_2$, or $(CF_2)_2OCF_2CFO(CF_2)_2OCFCF_2O(CF_2)_2;$
              |                    |
             $CF_3$               $CF_3$ $R_f'$ is $CF(OCF_2CF)_mO(CF_2)_5O(CFCF_2O)_nCF,$
         |        |              |         |
        $CF_3$   $CF_3$         $CF_3$    $CF_3$ where $m+n$ equals 4 or 5;

$R_f''$ is $CFO(CF_2)_5OCF$; $R_f'''$ is $CFOCF_2CFO(CF_2)_4;$
          |          |                  |        |
         $CF_3$     $CF_3$             $CF_3$   $CF_3$ $a$ is 1 when $b$ and $c$ are each zero; $b$ is 0.7 and $c$ is 0.3 when $a$ is zero; and $x$ is an integer having a value such that the polymer has an inherent viscosity from 0.10 to 1.0 when measured at 25° C as a 0.2 weight percent solution in hexafluoroisopropanol.

2. The polymer composition according to claim 1 in which $R_f$ is $(CF_2)_2O(CF_2)_5O(CF_2)_2;$ $R_f'$ is $CF(OCF_2CF)_mO(CF_2)_5O(CFCF_2O)_nCF,$
         |        |              |         |
        $CF_3$   $CF_3$         $CF_3$    $CF_3$ where $m+n$ equals 5; and $a$ is 1, and $b$ and $c$ are each zero.

3. The polymer composition according to claim 1 in which $R_f$ is $(CF_2)_2O(CF_2)_2O(CF_2)_2O(CF_2)_5O(CF_2)_2;$ $R_f'$ is $CF(OCF_2CF)_mO(CF_2)_5O(CFCF_2O)_n-CF,$
         |        |              |           |
        $CF_3$   $CF_3$         $CF_3$      $CF_3$ where $m+n$ equals 5; and $a$ is 1, and $b$ and $c$ are each zero.

4. The polymer composition according to claim 1 in which $R_f$ is $(CF_2)_2OCF_2CFO(CF_2)_2OCFCF_2O(CF_2)_2;$
              |                    |
             $CF_3$               $CF_3$ $R_f'$ is $CF(OCF_2CF)_mO(CF_2)_5O(CFCF_2O)_nCF,$
         |        |              |         |
        $CF_3$   $CF_3$         $CF_3$    $CF_3$ where $m+n$ equals 5; and $a$ is 1, and $b$ and $c$ are each zero.

5. The polymer composition according to claim 1 in which $R_f$ is $(CF_2)_2O(CF_2)_5O(CF_2)_2;$ $R_f''$ is $CFO(CF_2)_5OCF$; $R_f'''$ is $CFOCF_2CFO(CF_2)_4;$
          |          |                  |        |
         $CF_3$     $CF_3$             $CF_3$   $CF_3$ and $a$ is zero, $b$ is 0.7, and $c$ is 0.3

6. The polymer composition according to claim 1 in which $R_f$ is $(CF_2)_2O(CF_2)_2O(CF_2)_2O(CF_2)_5O(CF_2)_2;$ $R_f''$ is $CFO(CF_2)_5OCF$; $R_f'''$ is $CFOCF_2CFO(CF_2)_4;$
          |          |                  |        |
         $CF_3$     $CF_3$             $CF_3$   $CF_3$ and $a$ is zero, $b$ is 0.7, and $c$ is 0.3.

* * * * *

UNITED STATES PATENT AND TRADEMARK OFFICE
CERTIFICATE OF CORRECTION

PATENT NO. : 4,064,109

DATED : December 20, 1977

INVENTOR(S) : Robert C. Evers

It is certified that error appears in the above-identified patent and that said Letters Patent are hereby corrected as shown below:

Column 2, line 12, "bis(oaminophenol)" should read -- bis(o-aminophenol) --. Column 3, line 60, "bis(oaminophenol)" should read -- bis(o-aminophenol) --; line 63, "4,905,142" should read -- 4,005,142 --. Column 4, line 45, "(VII)" should read -- (VIII) --. Column 9, Formula (IV), "0.1", should read -- 0.3 --; third Formula, next to and after last bracket, insert subscript -- x --.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks